United States Patent
Lacarnoy

(10) Patent No.: US 8,488,336 B2
(45) Date of Patent: Jul. 16, 2013

(54) CONVERTER DEVICE COMPRISING AT LEAST FIVE DC VOLTAGE LEVELS AND UNINTERRUPTIBLE POWER SUPPLY PROVIDED WITH SAID DEVICE

(75) Inventor: Alain Lacarnoy, Saint Nazaire les Eymes (FR)

(73) Assignee: MGE UPS, Saint Ismier (FR)

( * ) Notice: Subject to any disclaimer, the term of this patent is extended or adjusted under 35 U.S.C. 154(b) by 231 days.

(21) Appl. No.: 12/926,002

(22) Filed: Oct. 20, 2010

(65) Prior Publication Data

US 2011/0110136 A1 May 12, 2011

(30) Foreign Application Priority Data

Nov. 6, 2009 (FR) ..................................... 09 05337

(51) Int. Cl.
*H02M 3/335* (2006.01)
*H02M 5/40* (2006.01)

(52) U.S. Cl.
USPC ............... 363/17; 363/34; 363/37; 363/132

(58) Field of Classification Search
USPC ................................... 363/17, 34, 37, 132
See application file for complete search history.

(56) References Cited

U.S. PATENT DOCUMENTS

| | | | | |
|---|---|---|---|---|
| 3,100,851 A | | 8/1963 | Ross et al. ..................... 307/107 |
| 5,644,483 A | * | 7/1997 | Peng et al. ...................... 363/37 |
| 6,005,788 A | * | 12/1999 | Lipo et al. ....................... 363/71 |
| 7,050,311 B2 | * | 5/2006 | Lai et al. ......................... 363/37 |
| 7,495,938 B2 | * | 2/2009 | Wu et al. ......................... 363/40 |
| 7,573,732 B2 | * | 8/2009 | Teichmann et al. ............. 363/51 |
| 7,710,082 B2 | * | 5/2010 | Escobar Valderrama et al. ............................. 323/207 |
| 8,184,460 B2 | * | 5/2012 | O'Brien et al. ................. 363/97 |
| 2005/0111246 A1 | * | 5/2005 | Lai et al. ....................... 363/157 |
| 2006/0221653 A1 | * | 10/2006 | Lai et al. ......................... 363/37 |
| 2009/0102436 A1 | * | 4/2009 | Escobar Valderrama et al. ............................. 323/207 |

OTHER PUBLICATIONS

Guedouani, R. et al, "Control of Capacitor Voltage of Three Phase Five-Level NPC Voltage Source Inverter. Application to Inductor Motor Drive," Electrical Machines and Power Electronics, 2007, ACEMP '07, International Aegean Conference on, 2007 IEEE, pp. 794-799.

Ceglia, G. et al, "A New Multilevel Inverter Topology," Proceedings of the Fifth IEEE International Caracas Conference on Devices, Circuits and Systems, Dominican Republic, Nov. 3-5, 2004, 2004 IEEE, pp. 212-208.

Rodriguez, J., et al, "Multilevel Converters: An Enabling Technology for High-Power Applications," Proceedings of the IEEE, vol. 97, No. 11, Nov. 2009, pp. 1786-1817.

\* cited by examiner

*Primary Examiner* — Bao Q Vu
(74) *Attorney, Agent, or Firm* — Steptoe & Johnson LLP

(57) ABSTRACT

A multi-level converter to at least convert an AC switched voltage available on a switched voltage point into at least five DC voltage levels available on positive and negative DC voltage lines, said converter comprising two separate switching units to convert respectively positive and negative half-waves of said switched voltage, connected to the DC voltage lines respectively presenting positive and negative DC voltage levels, and wherein each switching unit comprises a switching point connected to said switched voltage point by means of change-over means.

An uninterruptible power supply comprising said converter.

16 Claims, 8 Drawing Sheets

US 8,488,336 B2

CONVERTER DEVICE COMPRISING AT LEAST FIVE DC VOLTAGE LEVELS AND UNINTERRUPTIBLE POWER SUPPLY PROVIDED WITH SAID DEVICE

BACKGROUND OF THE INVENTION

The invention relates to the field of converter devices such as rectifiers and bidirectional converters able to act as a rectifier (AC/DC) or as an inverter (DC/AC), for example those used in uninterruptible power supplies, in particular in high-power uninterruptible power supplies, i.e. with a power generally comprised between about 10 and 500 kVA.

The invention more particularly relates to a multi-level converter device to at least convert a switched AC voltage available on a switched voltage point into at least five DC voltage levels available on DC voltage lines, said lines including a reference voltage line and as many lines having a positive voltage level as lines having a negative voltage level.

The invention also relates to an uninterruptible power supply comprising a power supply input on which an AC input voltage is applied, a rectifier connected to said input, two substantially DC voltage lines of opposite signs connected on output of said rectifier, and an inverter connected to said substantially DC voltage lines and comprising an output designed to supply a backed-up voltage.

STATE OF THE ART

Uninterruptible power supplies are commonly developed to improve their efficiency and to reduce audible nuisances generated by switching frequencies that are often low, i.e. about a few thousand hertz. In this context, it has been shown that it was interesting to use uninterruptible power supplies presenting topologies on several DC voltage levels, for example on five levels.

With reference to FIG. 1, a five-level converter device 1 enables an AC switched voltage VA available on a switched voltage point 3 to be converted into five DC voltage levels −U/2, −U/4, REF, U/4, U/2 available on DC voltage lines, said lines including a reference voltage line 5, lines 6, 7 having positive voltage levels U/2, U/4, and lines 8, 9 having negative voltage levels −U/2, −U/4. The term "switched" referring to the voltage available on switched voltage point 3 indicates that what is involved is the voltage before filtering by inductance 10 and capacitor 11. More precisely, positive voltage lines 6, 7 comprise an extreme voltage level U/2 and an intermediate voltage level U/4. In the same way, the negative voltage lines comprise an extreme voltage level −U/2 and an intermediate voltage level −U/4. The operating mode enabling the switched voltage to be converted into DC voltage is often qualified as rectifier mode. Converter device 1 represented in FIG. 1 is bidirectional, i.e. it can operate in inverter mode, that is to say it enables the five DC voltage levels −U/2, −U/4, REF, U/4, U/2 to be converted into switched voltage VA.

To enable conversion of the switched voltage into five DC voltage levels, in one direction or the other, converter device 1 comprises switching groups K1 to K5 connected between DC voltage lines 5, 6, 7, 8, 9 and switched voltage point 3. These switching groups among other things enable a switched voltage to be obtained on switched voltage point 3 by making the switching groups switch between two predefined consecutive voltage levels according to the required value of switched voltage VA. Command of these switching groups applies to both inverter mode and rectifier mode. Command of the switching groups is generally performed by Pulse Wave Modulation, PWM in short, this technique enabling voltage pulses comprised between two predefined consecutive voltage levels according to the required value of switched voltage VA to be generated on switched voltage point 3. The pulses thus generated present a variable width and a switching frequency that is high compared with the AC voltage frequency which is generally substantially equal to 50 or 60 Hertz.

Operation of the five-level converter device represented in FIG. 1 is described in the following with reference to FIG. 2 which represents the progression of the voltage at the terminals of switching group K2. The extreme DC voltage levels were chosen equal to 400 Volts, with a difference of 200 Volts between each DC voltage line 5, 6, 7, 8, 9 presenting consecutive voltage levels.

Between a start time t0 and a time t1 corresponding to the beginning of a positive half-wave of switched voltage VA, switching groups K2 and K3 are switched in complementary manner to make the value of switched voltage VA vary between the reference voltage, which is zero volts, and the intermediate voltage of 200 Volts. This complementary switching of switching groups K2 and K3 is performed so long as the amplitude of the positive half-wave is lower than that of the intermediate voltage of 200 Volts. During this time, the other switching groups K1, K4 and K5 are kept turned-off. It can therefore be observed that the voltage at the terminals of switching group K2 varies between 0 and 200 Volts.

Between time t1 and a time t2 corresponding to the middle of the positive half-wave, it is the turn of switching groups K1 and K2 to be switched in complementary manner to make the value of switched voltage VA vary between the intermediate voltage of 200 Volts and the extreme voltage of 400 Volts. This complementary switching of switching groups K1 and K2 is performed so long as the amplitude of the positive half-wave is comprised between that of the intermediate voltage of 200 Volts and that of the extreme voltage of 400 Volts. During this time, the other switching groups K3, K4 and K5 are kept turned-off. It can therefore be observed that the voltage at the terminals of switching group K2 varies between −200 and 0 Volts.

Between time t2 and a time t3 corresponding to the end of the positive half-wave, switching groups K2 and K3 are again switched in complementary manner to make the value of switched voltage VA vary between the reference voltage of zero volts and the intermediate voltage of 200 Volts, while the other switching groups K1, K4 and K5 are kept turned-off. This complementary switching of switching groups K2 and K3 is performed so long as the amplitude of the positive half-wave is lower than that of the intermediate voltage of 200 Volts. It can therefore be observed that the voltage at the terminals of switching group K2 varies between 0 and 200 Volts.

Between time t3 and a time t4 corresponding to the beginning of a negative half-wave of switched voltage VA, switching groups K3 and K4 are switched in complementary manner to make the value of switched voltage VA vary between the intermediate voltage of −200 Volts and the reference voltage of zero volts. This complementary switching of switching groups K3 and K4 is performed so long as the amplitude of the negative half-wave is lower than that of the intermediate voltage of 200 Volts. During this time, the other switching groups K1, K2 and K5 are kept turned-off. It can therefore be observed that the voltage at the terminals of switching group K2 varies between 200 and 400 Volts.

Between time t4 and a time t5 corresponding to the middle of the negative half-wave, it is the turn of switching groups K4 and K5 to be switched in complementary manner to make the value of switched voltage VA vary between the intermediate voltage of −200 Volts and the extreme voltage of −400 Volts. This complementary switching of switching groups K4 and K5 is performed so long as the amplitude of the negative half-wave is comprised between that of the intermediate voltage of −200 Volts and that of the extreme voltage of −400 Volts. During this time, the other switching groups K1, K2 and K3 are kept turned-off. It can therefore be observed that the voltage at the terminals of switching group K2 varies between 400 and 600 Volts.

Between time t5 and a time t6 corresponding to the end of the negative half-wave, switching groups K3 and K4 are again switched in complementary manner to make the value of switched voltage VA vary between the intermediate voltage of −200 Volts and the reference voltage of zero volts, while the other switching groups K1, K2 and K5 are kept turned-off. This complementary switching of switching groups K3 and K4 is performed so long as the amplitude of the negative half-wave is lower than the intermediate voltage of −200 Volts. It can therefore be observed that the voltage at the terminals of switching group K2 varies between 200 and 400 Volts.

By defining the switching voltage of a switching group as being the voltage difference at the terminals of said switching group between two consecutive switchings, it can be observed that the switching voltage of the switching group K2 is substantially equal to 200 Volts. The same is the case for the other switching groups.

As far as the holding voltage of switching group K2 is concerned, i.e. the voltage at the terminals of said switching group K2, it can be observed that the latter varies up to 600 Volts between times t4 and t5. In the same way, the holding voltage of switching group K4 also varies up to 600 Volts. As far as switching groups K1 and K5 are concerned, their holding voltages can for their part vary up to 800 Volts.

Switching groups K1 to K5 are generally essentially formed by static switches able to withstand the electrical voltages involved, such as field effect transistors. In the field of uninterruptible power supplies, the amplitude of the AC voltage can be comprised between 400 and 480 Volts, which implies the use of DC voltage levels of +/−450 Volts. In this voltage range, two types of static switches defined by their maximum holding voltage can generally be used. The first type of static switch can withstand a maximum holding voltage of 600 Volts. The second type of static switch can withstand a holding voltage of up to 1200 Volts. The choice of the type of static switch therefore depends on the architecture of the converter device, and in particular on the maximum holding voltage of their switching group.

In the case of converter device 1 represented in FIG. 1, switching groups K1, K2, K4 and K5 will therefore have to be equipped with static switches of the second type, i.e. static switches able to withstand a holding voltage of up to 1200 Volts.

However, the power losses during switchings of static switches able to withstand a high holding voltage are generally speaking much greater compared with a static switch able to withstand a lower holding voltage. For example purposes, the losses of a static switch withstanding a maximum holding voltage of 1200 Volts are substantially comprised between 4 and 5 times those of a static switch withstanding a maximum holding voltage of 600 Volts. It can therefore be understood that the use of static switches withstanding 1200 Volts for switching groups K1, K2, K4 and K5 of the converter device represented in FIG. 1 constitutes a drawback. Another drawback of the converter device represented in FIG. 1 is that each switching group K1 to K5 has to be designed to enable switchings at the frequency of the modulated width pulses, which is high compared with the frequency of the AC voltage.

SUMMARY OF THE INVENTION

The object of the invention is to provide a solution to the drawbacks of converter devices of the prior art by proposing a multi-level converter device to at least convert an AC switched voltage available on a switched voltage point into at least five DC voltage levels available on DC voltage lines, said lines including a reference voltage line and as many lines having positive voltage levels as lines having negative voltage levels, said device being characterized in that it comprises two separate switching units to convert half-waves of said respectively positive and negative switched voltage into at least two respectively positive and negative DC voltage levels, said switching units being connected to said reference voltage line and to the DC voltage lines respectively presenting a positive voltage level and a negative voltage level, and in that each switching unit comprises a switching point connected to said switched voltage point by means of change-over means, and switching groups connected between said lines to which said switching unit is connected and said switching point.

Each switching unit preferably comprises:
  a maximum voltage branch connected between the switching point of said switching unit and the DC voltage line connected to said switching unit having an extreme voltage level, said maximum voltage branch being provided with a first switching group,
  at least one intermediate voltage branch connected between said switching point and the at least one DC voltage line connected to said switching unit having an intermediate voltage level, said at least one intermediate voltage branch being provided with a second switching group, and
  a minimum voltage branch connected between said switching point and the reference voltage line, said minimum voltage branch being provided with a third switching group.

The second switching group is preferably the same on each intermediate voltage branch of one and the same switching unit.

According to one embodiment, the change-over means comprise a thyristor connected between the switched voltage point and the switching point of each switching unit, each thyristor being directed so as to make the current flow in a direction enabling the electric power available on said AC voltage point to be transferred to the switching point of each switching unit.

According to one embodiment, the change-over means comprise a diode connected between the switched voltage point and the switching point of each switching unit, each diode being directed so as to make the current flow in a direction enabling the electric power available on said AC voltage point to be transferred to the switching point of each switching unit. The change-over means advantageously further comprise a transistor directed in such a way as to conduct the current in the opposite direction.

The switching groups of each branch preferably at least enable the electric power to be transferred from the switching point to the DC voltage lines to which said branches are connected to regulate the voltage levels on said lines. The second switching group of each intermediate voltage branch and of each switching unit is preferably designed to enable conduction of a current in at least a first direction when the amplitude of the voltage on the switching point of said switching unit is greater than the amplitude of the voltage on the line to which said branch is connected, and to turn said current off whatever the amplitude of the voltage on the switching point. The second switching group of each intermediate voltage branch and of each switching unit is preferably designed to further enable conduction of a current in an opposite direction to said first direction when the amplitude of the voltage on the switching point of said switching unit is lower than the amplitude of the voltage on the line to which said branch is connected.

The second switching group of each intermediate voltage branch and of each switching unit preferably comprises:
  a transistor directed to enable conduction of a current in the first direction when the amplitude of the voltage on the switching point is greater than the amplitude of the voltage on the line to which said branch is connected,
  at least one diode connected in series with said transistor and directed to let a current flowing in said first direction pass, and
  a diode connected in parallel to said transistor and reverse-directed with respect to said transistor.

The second switching group of each intermediate voltage branch and of each switching unit preferably further comprises a transistor directed to enable conduction of a current in the opposite direction to the first direction when the amplitude of the voltage on the switching point is lower than the amplitude of the voltage on the line to which said branch is connected.

The first switching group of each maximum voltage branch and of each switching unit preferably comprises at least one diode directed to at least turn the current off in a second direction when the amplitude of the voltage on the switching point of said switching unit is lower than the amplitude of the voltage on the line to which said branch is connected. The first switching group of each maximum voltage branch and of each switching unit preferably further comprises a transistor directed to enable conduction of a current in an opposite direction to the second direction when the amplitude of the voltage on the switching point is lower than the amplitude of the voltage on the line to which said branch is connected.

The third switching group of each minimum voltage branch and of each switching unit is preferably designed to enable conduction of a current in at least a third direction when the amplitude of the voltage on the switching point of said switching unit is greater than the amplitude of the voltage on the reference voltage line, and to let a current flow in an opposite direction to said third direction. The third switching group of each intermediate voltage branch and of each switching unit advantageously comprises:
  a transistor directed to enable conduction of a current in the third direction when the amplitude of the voltage on the switching point of said switching unit is greater than the amplitude of the voltage on the reference voltage line, and
  a diode connected in parallel to said transistor and directed to let a current flowing in an opposite direction to said third direction pass.

The invention also relates to an uninterruptible power supply comprising a power supply input on which an AC input voltage alternative is applied, a rectifier connected to said input, two substantially DC voltage lines of opposite signs connected on output of said rectifier, an inverter connected to said substantially DC voltage lines and comprising an output designed to supply a backed-up voltage, characterized in that said inverter is a converter device as described in the foregoing and supplying a backed-up AC voltage from the substantially DC voltages.

BRIEF DESCRIPTION OF THE DRAWINGS

Other advantages and features will become more clearly apparent from the following description of particular embodiments of the invention, given as non-restrictive examples only and represented in the accompanying drawings.

DETAILED DESCRIPTION OF AN EMBODIMENT

Figure 1:
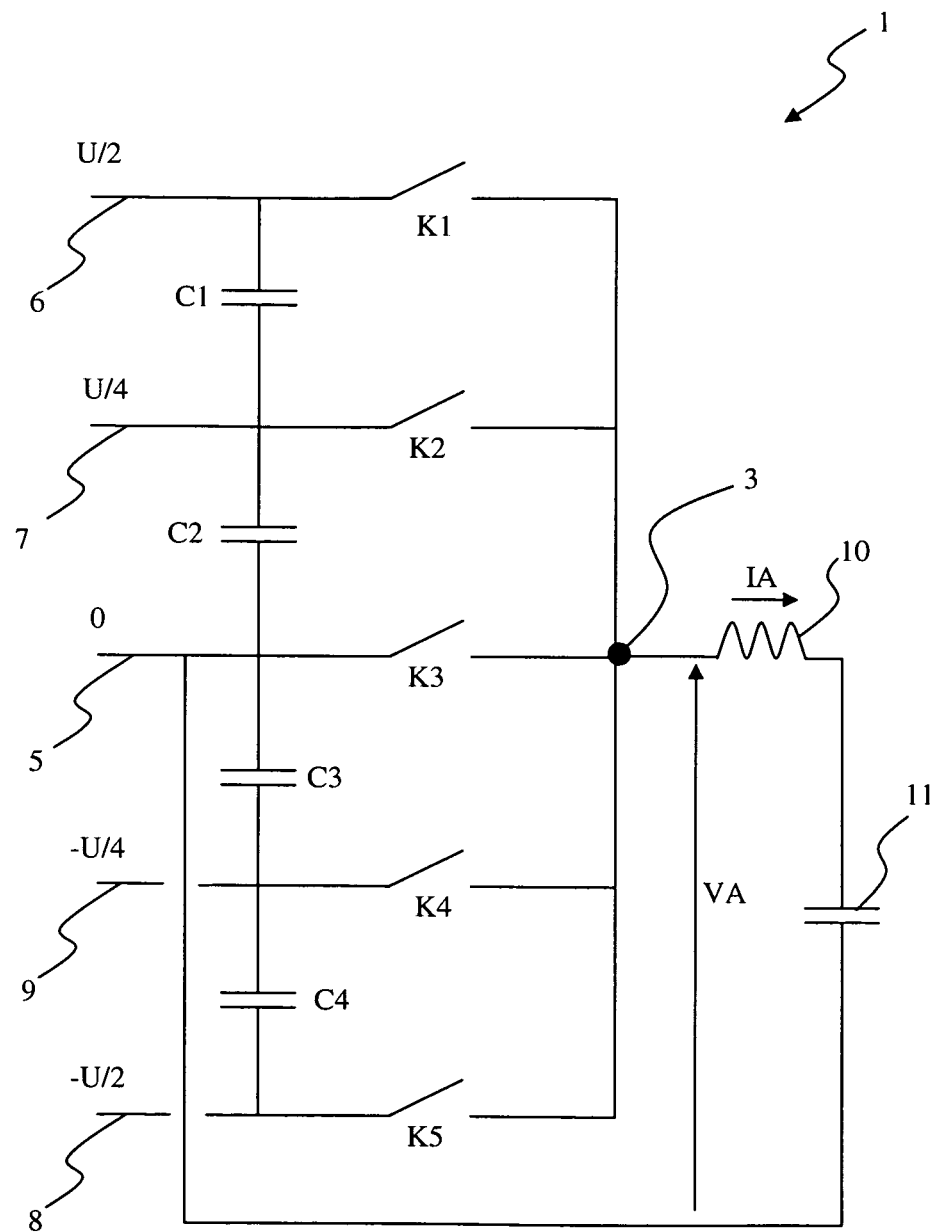
FIG. 1 represents a converter device according to the prior art.
Figure 2:
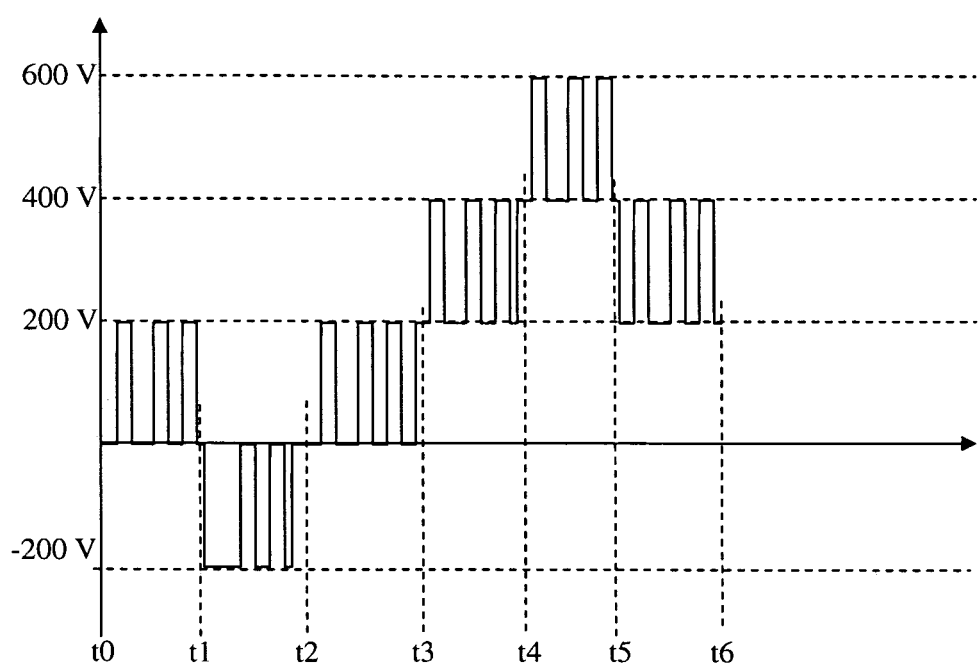
FIG. 2 represents the variations versus time of the voltage at the terminals of the switching group K2 of the converter device of FIG. 1.
Figure 3:
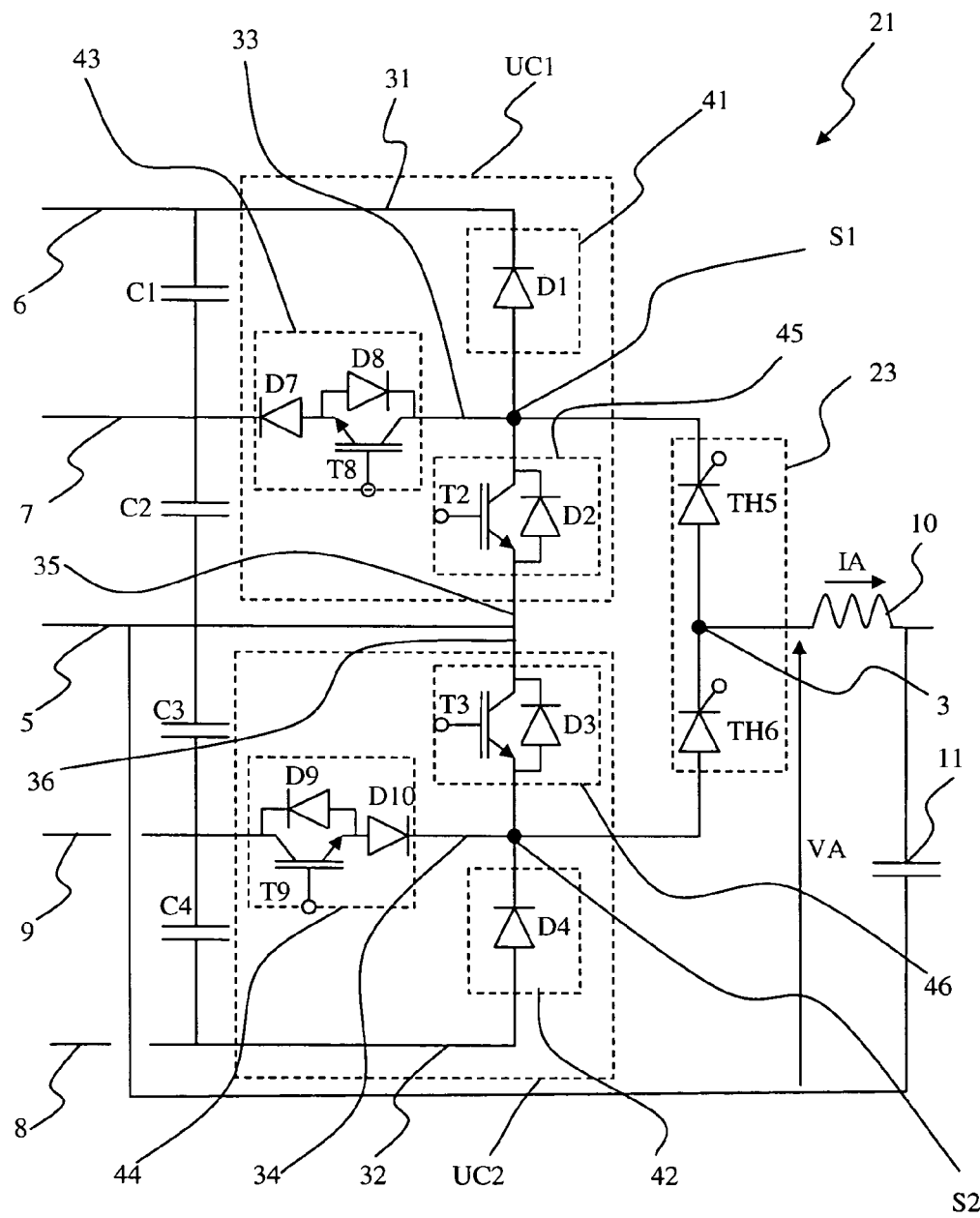
FIG. 3 represents a converter device according to the invention enabling operation in rectifier mode only.

With reference to FIG. 3, converter device 21 enables operation in rectifier mode only. More precisely, converter device 21 enables an AC switched voltage VA available on a switched voltage point 3 to be converted into at least five DC voltage levels $-U/2$, $-U/4$, REF, $U/4$, $U/2$ available on DC voltage lines 5, 6, 7, 8, 9. The DC voltage lines include a reference voltage line 5, two DC voltage lines 6, 7 having positive voltage levels and two DC voltage lines 8, 9 having negative voltage levels. Converter device 21 comprises capacitors C1-C4 interposed between each DC voltage line 5-9. These capacitors enable switching and power balance to be obtained between the different DC voltage levels, and also constitute a power reserve on each DC voltage line. These capacitors C1-C4 also enable filtering to be performed of the variable width current pulses generated by the pulse width modulation technique.

As can be seen in FIG. 3, converter device 21 comprises two separate switching units UC1, UC2 to convert respectively positive and negative half-waves of switched voltage VA into respectively three positive DC voltage levels (0, $U/4$, $U/2$) and three negative DC voltage levels (0, $-U/4$, $-U/2$). Switching unit UC1 to convert the positive half-waves into three positive DC voltage levels is connected to reference voltage line 5 and to DC voltage lines 6, 7 having positive voltage levels. Switching unit UC2 to convert the negative half-waves into three negative DC voltage levels is connected to reference voltage line 5 and to DC voltage lines 8, 9 having negative voltage levels. In the following, a distinction can be made between switching units UC1, UC2 by mentioning that switching unit UC1 is dedicated to the positive half-waves and that switching unit UC2 is dedicated to the negative half-waves.

As can be seen in FIG. 3, each switching unit comprises a switching point S1, S2 connected to switched voltage point 3 by means of change-over means 23. The voltage obtained on switching point S1, S2 of each switching unit corresponds to that of the half-waves to which said unit is dedicated. The term "switching" makes reference to a switching performed by each switching unit UC1, UC2 to distribute the power of the half-wave available on switching point S1, S2 to DC voltage lines 5-9 to which said switching unit is connected. Change-over means 23 enable switching units UC1, UC2 to be switched over by connecting switching point S1, S2 of a switching unit UC1, UC2 to switched voltage point 3 according to the sign of the half-wave of switched voltage VA. The change-over means thus enable switched voltage point 3 to be connected to switching point S1 during the positive half-waves of switched voltage VA and to switching point S2 during the negative half-waves of said switched voltage VA. Compared with converter device 1 according to the prior art, change-over means 23 constitute a switching group operating with a lower switching frequency than the frequency of the modulated width pulses, which enables power losses to be limited. Each change-over is moreover performed at the moment the value of switched voltage VA crosses zero volts, which softens said switchings.

In the embodiment represented in FIG. 3, the change-over means 23 comprise two thyristors TH5, TH6 connected between switched voltage point 3 and switching point S1, S2 of each switching unit UC1, UC2, each thyristor being directed to make the current flow in a direction enabling the electric power available on said DC voltage point to be transferred to the switching point of each switching unit. In other embodiments, these thyristors TH5, TH6 would have been able to be replaced by diodes directed in the same manner. The advantage of using thyristors rather than diodes is essentially to enable prior charging of the DC voltage lines without having to use a system dedicated to this prior charging using contactors and resistors. This is particularly advantageous when converter device 21 is designed to be used in an uninterruptible power supply.

As can be seen in FIG. 3, each switching unit UC1, UC2 comprises switching groups connected between the DC voltage lines to which said switching unit is connected and switching point S1, S2 of said switching unit.

More precisely, each switching unit comprises a maximum voltage branch 31, 32 connected between switching point S1, S2 of said switching unit and DC voltage line 6, 8 having an extreme voltage level, an intermediate voltage branch 33, 34 connected between said switching point S1, S2 and DC voltage line 7, 9 having an intermediate voltage level, and a minimum voltage branch 35, 36 connected between said switching point S1, S2 and reference voltage line 5. Maximum voltage branch 31, 32 is provided with a first switching group 41, 42. Intermediate voltage branch of 33, 34 is provided with a second switching group 43, 44. Minimum voltage branch 35, 36 is provided with a third switching group 45, 46. Switching groups 41-46 enable electric power to be transferred from switching point S1, S2 to DC voltage lines 5, 6, 7, 8, 9 to which said branches 31-36 are connected to regulate the voltage levels on said lines. As illustrated in the following, this architecture has the advantage of reducing the holding voltage of the switching groups used.

In the embodiment represented in FIG. 3, second switching group 43, 44 of each intermediate voltage branch 33, 34 and of each switching unit UC1, UC2 comprises:
 a transistor T8, T9 directed to enable conduction of a current in at least a first direction when the amplitude of the voltage on switching point S1, S2 is greater than the amplitude of the voltage on line 7, 9 to which said branch is connected,
 a diode D7, D10 connected in series with said transistor and directed to let a current flowing in said first direction pass, and
 a diode D8, D9 connected in parallel to said transistor and reverse-directed with respect to said transistor.

In the embodiment represented in FIG. 3, first switching group 41, 42 of each maximum voltage branch 31, 32 and of each switching unit UC1, UC2 comprises a diode D1, D4 directed to turn the current off in a second direction when the amplitude of the voltage on switching point S1, S2 of said switching unit is lower than the amplitude of the voltage on line 6, 8 to which said branch is connected.

In the embodiment represented in FIG. 3, third switching group 45, 46 of each minimum voltage branch 35, 36 and of each switching unit UC1, UC2 comprises:
 a transistor T2, T3 directed to enable conduction of a current in a third direction when the amplitude of the voltage on switching point S1, S2 of said switching unit is greater than the amplitude of the voltage on reference voltage line 5, and
 a diode D2, D3 connected in parallel to said transistor and directed to let a current flowing in an opposite direction to said third direction pass.

Figure 4:
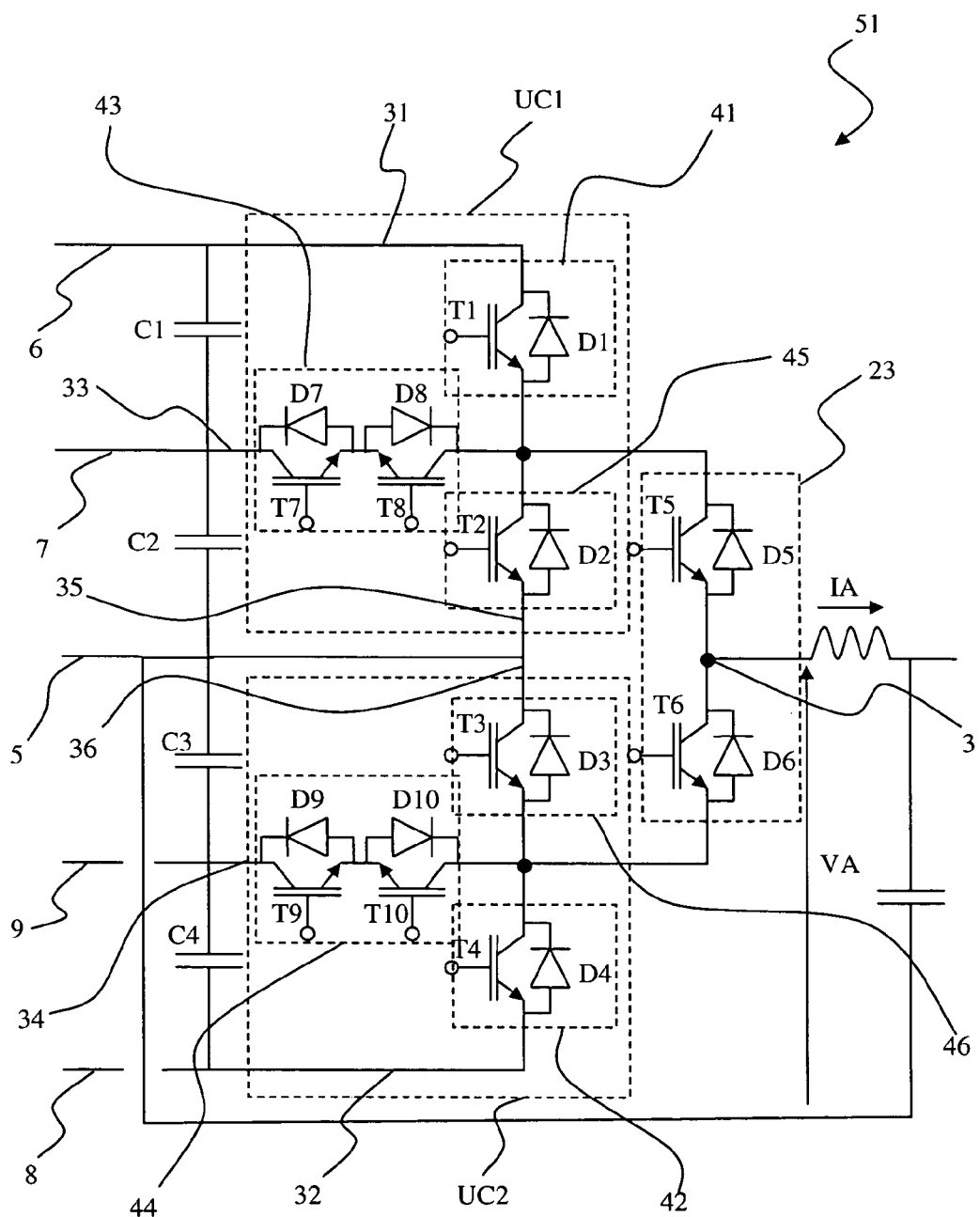
FIG. 4 represents a converter device according to the invention enabling operation in rectifier mode and in inverter mode.

With reference to FIG. 4, converter device 51 enables operation in both rectifier mode and in inverter mode, i.e. it further enables the five DC voltage levels −U/2, −U/4, REF, U/4, U/2 available on DC voltage lines 5, 6, 7, 8, 9 to be converted into a switched voltage VA available on switched voltage point 3. Converter device 51 comprises most of the elements described in the foregoing with reference to FIG. 3, and these elements are referenced in the same way.

In the embodiment represented in FIG. 4, change-over means 53 comprise a diode D5, D6 connected between switched voltage point 3 and switching point S1, S2 of each switching unit, each diode being directed to make the current flow in a direction enabling the electric power available on said AC voltage point to be transferred to switching point S1, S2 of each switching unit UC1, UC2. Change-over means 53 further comprise a transistor T5, T6 directed to conduct the current in the opposite direction.

Switching units UC1, UC2 of converter device 51 represented in FIG. 4 comprise maximum voltage branches, 31, 32, intermediate voltage branches 33, 34 and minimum voltage branches 35, 36, as in the embodiment of FIG. 3. The switching groups of converter device 51 have been referenced in the same way as those of converter device of FIG. 3, although they comprise additional components enabling operation in inverter mode.

In the embodiment represented in FIG. 4, second switching group 43, 44 of each intermediate voltage branch 33, 34 and of each switching unit UC1, UC2 comprises:
 a transistor T8, T9 directed to enable conduction of a current in a first direction when the amplitude of the voltage on switching point S1, S2 is greater than the amplitude of the voltage on line 7, 9 to which said branch is connected,
 a diode D7, D10 connected in series with said transistor and directed to let a current flowing in said first direction pass,
 a diode D8, D9 connected in parallel to said transistor and reverse-directed with respect to said transistor, and
 a transistor T7, T10 directed to enable conduction of a current in the opposite direction to said first direction when the amplitude of the voltage on switching point S1, S2 is lower than the amplitude of the voltage on DC voltage line 7, 9 to which said branch is connected.

In the embodiment represented in FIG. 4, first switching group 41, 42 of each maximum voltage branch 31, 32 and of each switching unit UC1, UC2 comprises:

a diode D1, D4 directed to at least turn the current off in a second direction when the amplitude of the voltage on switching point S1, S2 of said switching unit is lower than the amplitude of the voltage on line 6, 8 to which said branch is connected, and a transistor T1, T4 directed to enable conduction of a current in an opposite direction to said second direction when the amplitude of the voltage on said switching point is lower than the amplitude of the voltage on line 6, 8 to which said branch is connected.

In the embodiment represented in FIG. 4, third switching group 45, 46 of each minimum voltage branch 35, 36 and of each switching unit UC1, UC2 comprises:

a transistor T2, T3 directed to enable conduction of a current in at least a third direction when the amplitude of the voltage on switching point S1, S2 of said switching unit is greater than the amplitude of the voltage on reference voltage line 5, a diode D2, D3 connected in parallel to said transistor and reverse-directed with respect to said transistor.

Figure 5:
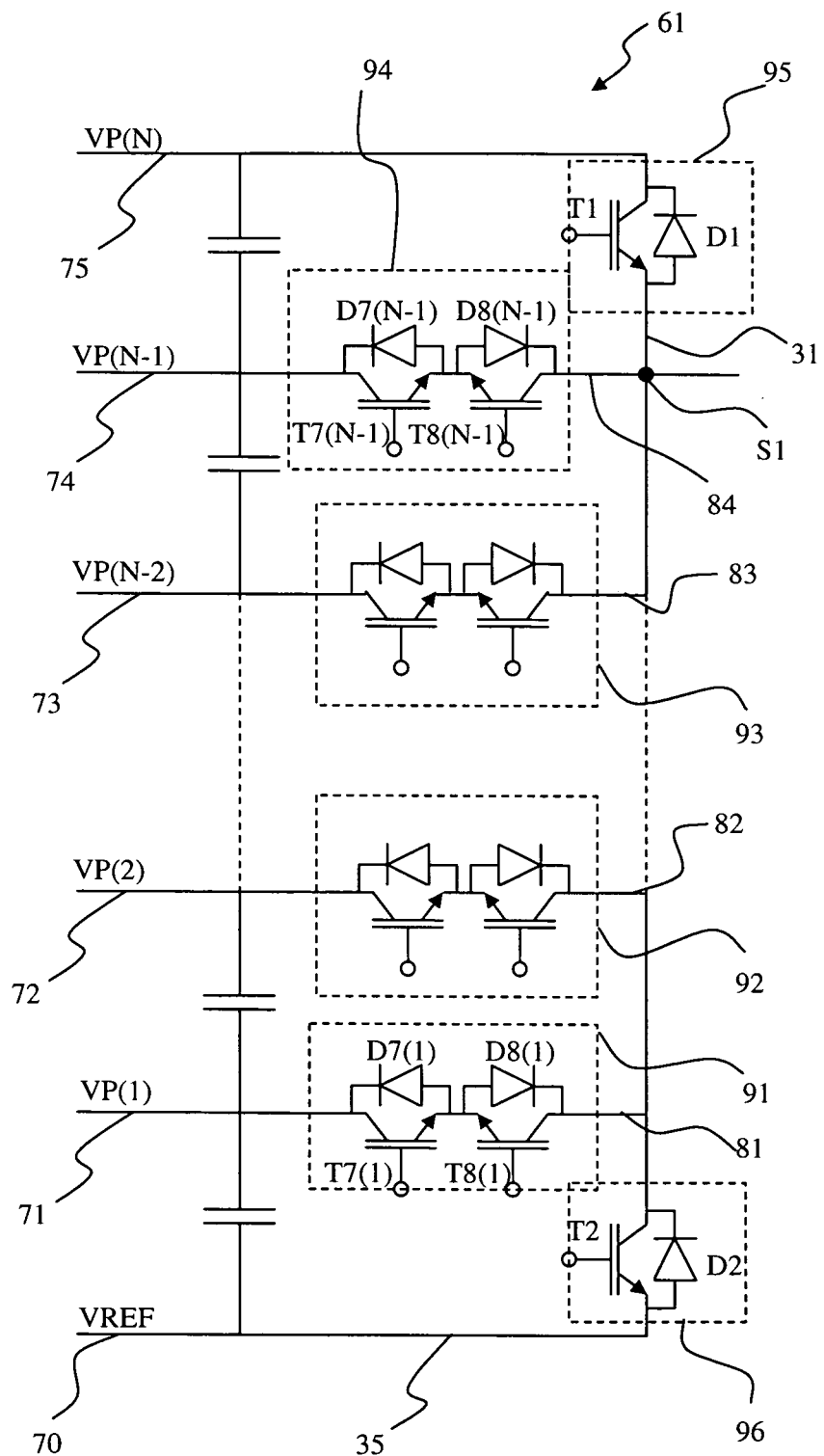
FIG. 5 represents a converter device according to the invention having a number of DC voltage levels greater than five.

With reference to FIG. 5, the converter device, for which only switching unit 61 dedicated to positive half-waves has been represented, enables operation in rectifier mode and in inverter mode, to convert 2N+1 DC voltage levels VREF, VP(1)-VP(N) available on as many DC voltage lines 70, 71, 72, 73, 74, 75 in both directions into a switched voltage VA available on the switched voltage point. Converter device 61 comprises most of the elements described in the foregoing with reference to FIG. 4, and these elements are referenced in the same way.

Switching unit 61 dedicated to positive half-waves represented in FIG. 5 comprises a maximum voltage branch 31 and a minimum voltage branch 35, as in the embodiment of FIG. 4. Switching unit 61 further comprises a number N−1 of intermediate voltage branches 81, 82, 83, 84 connected between switching point S1 of said switching unit and voltage lines 71, 72, 73, 74 having an intermediate voltage level VP(1)-VP(N−1).

As far as the switching unit dedicated to negative half-waves is concerned, the latter also comprises an extreme voltage branch and a minimum voltage branch, as in the embodiment of FIG. 4. The switching unit dedicated to negative half-waves also comprises a number N−1 of intermediate voltage branches connected between switching point S2 of said switching unit and the voltage lines having intermediate voltage levels.

Each intermediate voltage branch 81, 82, 83, 84 of switching unit 61 comprises at least a second switching group 91, 92, 93, 94, as in the embodiment of FIG. 4. The N−1 switching groups 91, 92, 93, 94 are in this case substantially identical to second switching group 33 of converter device 51 of FIG. 4. In the same way, extreme voltage branch 31 and minimum voltage branch 35 of switching unit 61, as in the embodiment of FIG. 4, respectively comprises a first and third switching group 95, 96 respectively substantially identical to first switching group 41 and third switching group 45 of converter device 51 of FIG. 4.

As far as the switching unit dedicated to negative half-waves is concerned, as in the embodiment of FIG. 4, the latter also comprises a first switching group and a third switching group that are substantially the same as the first and third switching group 42, 46 of device 51 represented in FIG. 4. The switching unit dedicated to negative half-waves also comprises a number N−1 of second switching groups which are substantially the same as second switching group 44 of device 51 represented in FIG. 4.

More precisely, first intermediate voltage branch 81 connected to DC voltage line 71 having a first intermediate voltage level VP(1) comprises:

a transistor T8(1), T9(1) directed to enable conduction of a current in a first direction when the amplitude of the voltage on switching point S1, S2 is greater than the amplitude of the voltage on the line to which said branch is connected, a diode D7(1), D10(1) connected in series with said transistor and directed to let a current flowing in said first direction pass, a diode D8(1), D9(1) connected in parallel to said transistor and reverse-directed with respect to said transistor, and a transistor T7(1), T10(1) directed to enable conduction of a current in the opposite direction to said first direction when the amplitude of the voltage on switching point S1, S2 is lower than the amplitude of the voltage on the DC voltage line to which said branch is connected.

In the same way, the last intermediate voltages branches 84 connected to DC voltage line 74 having a last intermediate voltage level VP(N−1) comprise:

a transistor T8(N−1), T9(N−1) directed to enable conduction of a current in a first direction when the amplitude of the voltage on switching point S1, S2 is greater than the amplitude of the voltage on the line to which said branch is connected, a diode D7(N−1), D10(N−1) connected in series with said transistor and directed to let a current flowing in said first direction pass, a diode D8(N−1), D9(N−1) connected in parallel to said transistor and reverse-directed with respect to said transistor, and a transistor T7(N−1), T10(N−1) directed to enable conduction of a current in the opposite direction to said first direction when the amplitude of the voltage on switching point S1, S2 is lower than the amplitude of the voltage on the DC voltage line to which said branch is connected.

Multiplication of the number of levels on the converter device enables the associated filtering devices, in particular the inductance, to be minimized.

With reference to FIGS. 6A to 6E, control of switching unit UC1 dedicated to the positive half-waves of switched voltage VA of the converter devices represented in FIG. 3 or 4 is described in the following. Control of switching unit UC2 dedicated to the negative half-waves of switched voltage VA of these converter devices has also been described in parallel.

FIGS. 6A, 6B, 6C, 6D and 6E represent the variations in time of the control signals of the transistors of switching unit UC1 respectively referenced T1, T2, T5, T7, T8. When the signal represented is at level 1, the transistor commanded by said signal is conducting or on. Inversely, when the signal represented is at zero level, the transistor commanded by said signal is no longer conducting or is off.

Figure 6A:
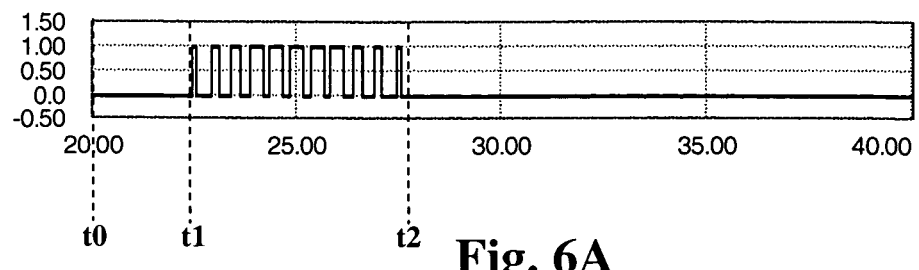
FIGS. 6A to 6E represent the variations versus time in milliseconds of the control signals of the transistors in the switching groups of the converter device represented in FIG. 4.
Figure 6B:
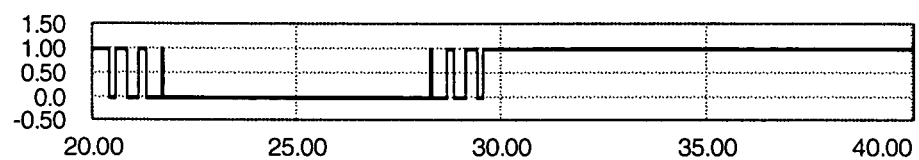
Figure 6C:
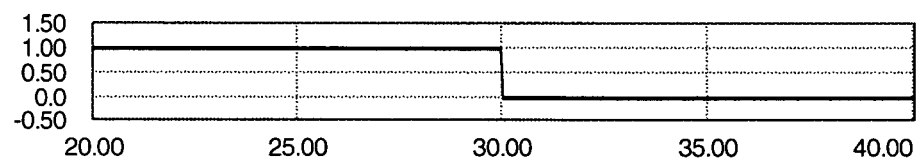

As can be seen in FIG. 6C, during the positive half-waves of switched voltage VA, transistor T5 is on. Inversely, during the negative half-waves of switched voltage VA, transistor T5 is off. Command of transistors T5, T6 of change-over means 53 is complementary. In this way, switching of transistors T5, T6 of the change-over means is performed at low frequency, i.e. twice the frequency of switched voltage VA, which enables power losses linked to switching to be minimized. Furthermore, switching of transistors T5, T6 is performed with switching voltages substantially equal to zero, which enables these switching losses to be reduced even further.

Figure 6D:
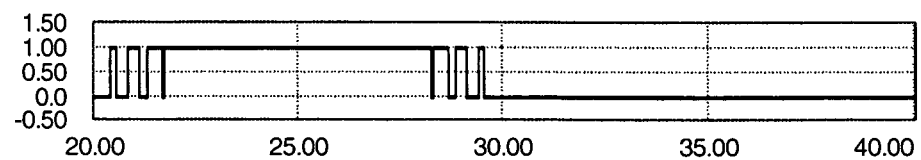
Figure 6E:
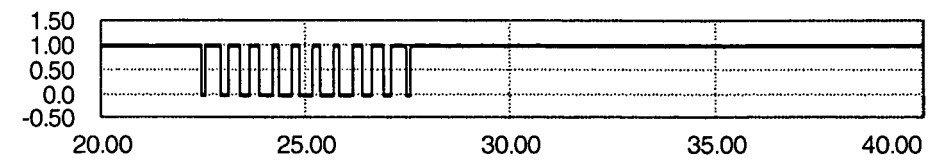

At a first time t0, to obtain a beginning of the half-wave of switched voltage VA up to a voltage having an amplitude substantially equal to the amplitude or the absolute value of intermediate voltage level U/4, −U/4, the voltage on switching point S1, S2 is made to vary between the reference voltage level which is assumed to be substantially equal to zero volts and intermediate voltage level U/4, −U/4. To do this, successive switchings are performed simultaneously using third and second switching group 45, 46, 43, 44 respectively arranged on minimum voltage branch 35, 36 and intermediate voltage branch 33, 34. As can be seen in FIGS. 6B and 6D, these successive switchings are performed using the pair of transistors T2 and T7 for the positive half-waves. In the same way, the pair of transistors T3 and T10 are used for the beginning of the negative half-waves. At the same time, transistor T8 (FIG. 6E) is kept on to enable operation when switched voltage VA and AC current IA are of opposite signs. In the same way, transistor T9 is kept on for the beginning of the negative half-waves. More precisely, to obtain a reference voltage on switching output S1, respectively S2, transistor T2, respectively T3 is turned on, and transistor T7, respectively T10 is turned off. Inversely, to obtain an intermediate voltage on switching output S1, respectively S2, transistor T7, respectively T10 is turned on, and transistor T2, respectively T3 is turned off. Command of the two transistors of each of the pairs of transistors is therefore complementary.

At a second time t1, to obtain a part of the half-wave of switched voltage VA having an amplitude varying between the amplitude or the absolute value of the intermediate voltage level and the amplitude or the absolute value of the maximum voltage level, the voltage on switching point S1, S2 is made to vary between intermediate voltage level U/4, −U/4 and extreme voltage level U/2, −U/2. To do this, successive switchings are performed simultaneously using the second and first switching group 43, 44, 41, 42 respectively arranged on intermediate voltage branch 33, 34 and extreme voltage branch 31, 32. These successive switchings are in this instance made using the pairs of transistors T1 and T8 for the positive half-waves (FIGS. 6A and 6E), and the pair of transistors T4 and T9 for the negative half-waves. At the same time, transistor T7 for the positive half-waves and the transistor T10 for the negative half-waves are kept on to enable operation when switched voltage VA and AC current IA are of opposite signs (FIG. 6D). More precisely, to obtain an intermediate voltage on switching output S1, respectively S2, transistor T8, respectively T9 is turned on, and transistor T1, respectively T8 is turned off. Inversely, to obtain an extreme voltage on switching output S1, respectively S2, transistor T1, respectively T8 is turned on, and transistor T8, respectively T9 is turned off. Command of the two transistors of each of the pairs of transistors is therefore complementary.

At a third time t2, to obtain an end of the half-wave of switched voltage VA having an amplitude varying between the amplitude or the absolute value of the intermediate voltage level up to the reference voltage, the voltage on switching point S1, S2 is made to vary between the reference voltage level and intermediate voltage level U/4, −U/4. To do this, successive switchings are performed simultaneously using the third and second switching group 45, 46, 43, 44 respectively arranged on minimum voltage branch 35, 36 and intermediate voltage branch 33, 34, i.e. in the same way as between time t0 and t1 (FIGS. 6B and 6D).

Figure 7A:
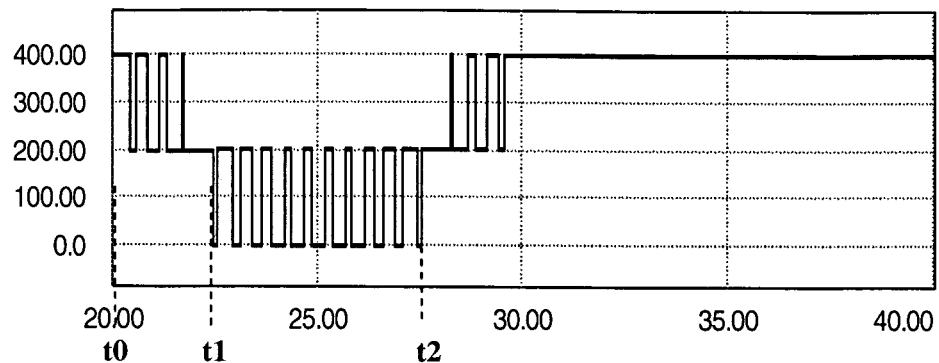
FIGS. 7A to 7C represent the variations versus time in milliseconds of the voltage at the terminals of the switching groups of the converter device represented in FIG. 4
Figure 7B:
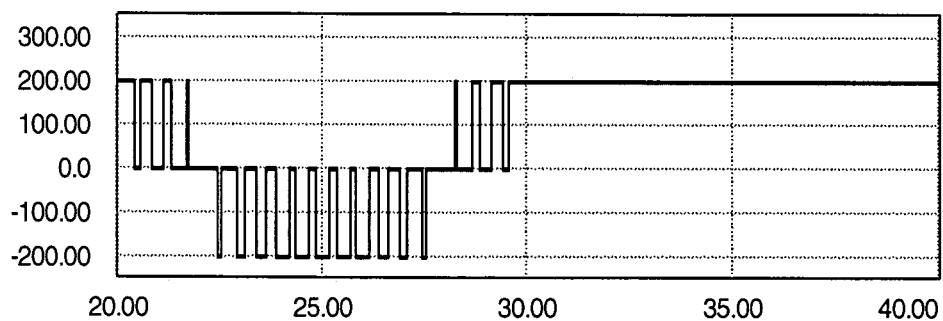
Figure 7C:
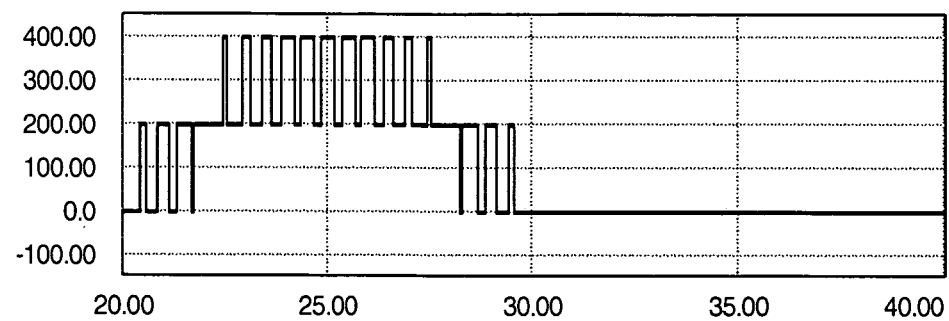

With reference to FIGS. 7A to 7C, the variations in time of the voltages at the terminals of the first, second and third switching group have been represented. The extreme DC voltage levels were chosen equal to −400 and 400 Volts with a difference of 200 Volts between each DC voltage line presenting consecutive voltage levels.

It can be observed that the switching voltage at the terminals of each of these switching groups, and therefore of the electronic components which compose the latter, is substantially equal to 200 Volts. As far as the holding voltage is concerned, it is never greater than 400 volts. It is thus possible to electronic components able to withstand a lower holding voltage than that of converter devices of the prior art, for example components able to withstand a holding voltage of up to 600 Volts. The power losses are thereby minimized.

Command of converter device comprising 2N+1 DC voltage levels represented in FIG. 5 is performed in comparable manner as far as the beginnings and ends of half-waves are concerned. More precisely, command to obtain a beginning or end of half-wave having an amplitude comprised between the reference voltage and a voltage equal to the absolute value of the first intermediate voltage level is achieved by making the voltage on switching point S1, S2 vary between the reference voltage level and said first intermediate voltage level. To do this, successive switchings are performed simultaneously using third switching group 96 and second switching group 91 respectively arranged on minimum voltage branch 35 and first intermediate voltage branch 81. Command of the converter device with several levels is thus achieved, as far as the beginning and end of half-wave as concerned, in the same way as command of the converter devices of FIGS. 3 and 4 described in the foregoing, replacing transistors T7 of the switching unit of FIG. 3 or 4 by transistor T7(1) of switching unit 61 of FIG. 6.

In the case of a converter device with 2N+1 levels represented in FIG. 5, command to obtain a half-wave peak having an amplitude comprised between a voltage equal to the amplitude or the absolute value of the last intermediate voltage level and an extreme voltage is performed by making the voltage on switching point S1, S2 vary between said extreme voltage level and said last intermediate voltage level. To do this, successive switchings are performed simultaneously using the second and first switching group respectively arranged on the last intermediate voltage branch and on the extreme voltage branch. Command of the converter device with several levels is thus achieved, as far as the half-wave peak is concerned, in the same way as command of the device of FIG. 3 from time t1 described in the foregoing, replacing transistors T7 of the switching unit of FIG. 3 or 4 by transistor T7(N) of switching unit 61 of FIG. 6.

In the case of a converter device with several levels represented in FIG. 5, command to obtain a half-wave part having an amplitude comprised between a voltage equal to the amplitude or the absolute value of an intermediate voltage level of rank I and that of a consecutive intermediate voltage level of rank I+1 is performed by making the voltage on switching point S1, S2 vary between said intermediate voltage level and said consecutive intermediate voltage level. To do this, successive switchings are performed simultaneously using the second switching groups respectively arranged on the intermediate voltage branch and on the consecutive intermediate voltage branch.

Figure 8:
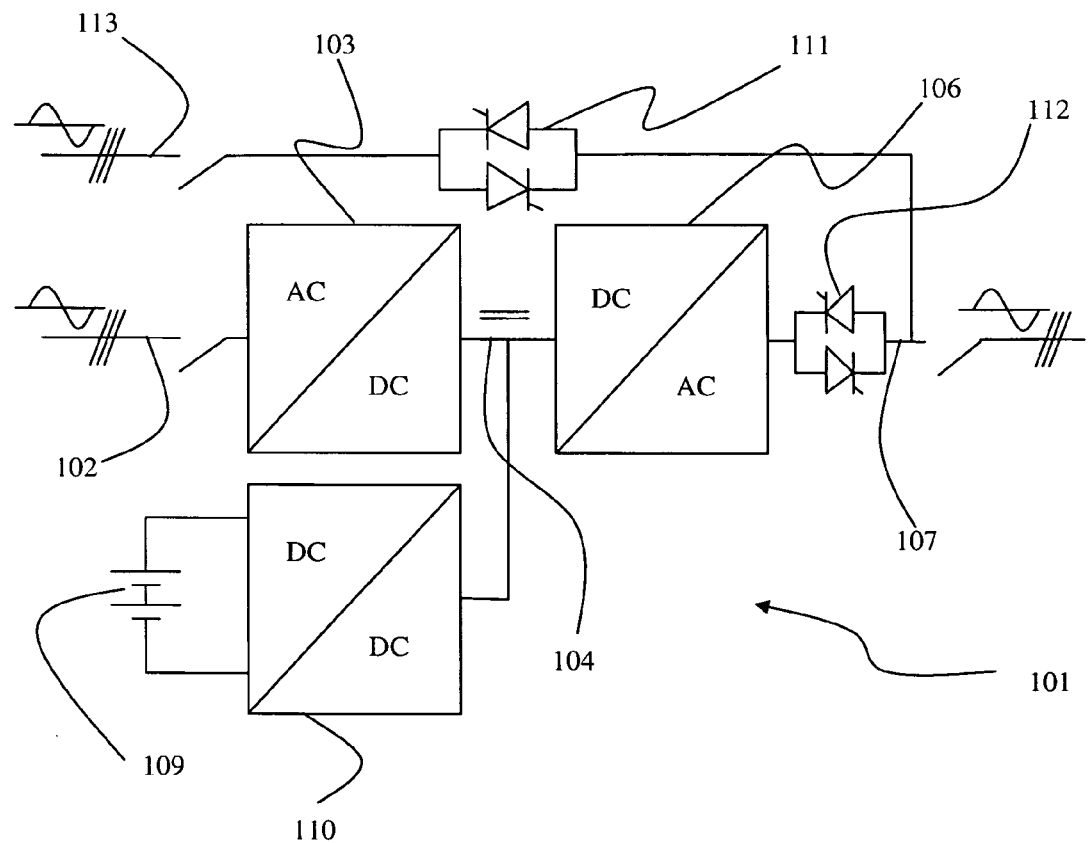
FIG. 8 represents an uninterruptible power supply comprising a converter device according to the invention.

The converter devices described above can be used in an uninterruptible power supply 101 such as the one represented in FIG. 8. This uninterruptible power supply comprises a power supply input 102 on which a variable input voltage of a first three-phase power system is applied. The uninterruptible power supply comprises a rectifier 103, said rectifier being connected between power supply input 102 on the one hand and two output lines 104 or busses of substantially DC voltage. The uninterruptible power supply comprises an inverter 106 connected between output lines 104 and an output 107 designed to supply a backed-up three-phase voltage to a load 108. DC voltage bus 104 is also connected to a battery 109 via a DC/DC converter 110.

In uninterruptible power supply 101 represented in FIG. 8, the rectifier could be a converter device such as the one represented in FIG. 3. In the same way, inverter 106 could be a converter device such as the one represented in FIG. 4.

As can be seen in FIG. 8, static contactors 111 and 112 enable selection to be made between power supply input 102 of the first three-phase power system and a power supply input 113 of a second power system which is also three-phase. It is thus possible to supply the load via the first power system backed-up by uninterruptible power supply 101, and if required to switch over to the second power system.

The invention claimed is:

1. A multi-level converter device for converting an AC voltage into a plurality of DC voltage levels, said device comprising:
two separate switching units for converting half-waves of an AC voltage into at least two, respectively positive and negative, DC voltage levels,
said switching units being connected to a reference DC voltage line and to at least two pairs of DC voltage lines, each pair comprising, respectively, a positive voltage level line and a negative voltage level line, said levels with respect to the voltage level of the reference DC voltage line, and
two change-over means, wherein each change-over means is connected between a switching point of each switching unit and an AC voltage source.

2. A multi-level converter device according to claim 1, wherein a switching unit comprises:
a maximum voltage branch connected between said switching unit and the DC voltage line connected to said switching unit, and having an extreme voltage level, said maximum voltage branch having a first switching group, at least one intermediate voltage branch connected between said switching unit, and the at least one DC voltage line connected to said switching unit having an intermediate voltage level, said at least one intermediate voltage branch having a second switching group, and
a minimum voltage branch connected between said switching point of the switching unit and the reference voltage line, said minimum voltage branch having a third switching group.

3. A multi-level converter device according to claim 2, wherein the second switching group is the same on each intermediate voltage branch of one switching unit.

4. A multi-level converter device according to claim 1, wherein the change-over means comprise a thyristor connected between the AC voltage source and the switching point of each switching unit, each thyristor being directed to make the current flow in a direction enabling the electric power available on said AC voltage source to be transferred to the switching point of each switching unit.

5. A multi-level converter device according to claim 1, wherein the change-over means comprise a diode connected between the AC voltage source and the switching point of each switching unit, each diode being directed to make the current flow in a direction enabling the electric power available on said AC voltage source to be transferred to the switching point of each switching unit.

6. A multi-level converter device according to claim 5, wherein the change-over means further comprise a transistor directed to conduct the current in the opposite direction.

7. A multi-level converter device according to claim 2, wherein the switching groups of each branch at least enable the electric power to be transferred from the switching point to the DC voltage lines to which said branches are connected to regulate the voltage levels on said lines.

8. A multi-level converter device according to claim 7, wherein the second switching group of each intermediate voltage branch and of each switching unit is designed to enable conduction of a current in at least a first direction when the amplitude of the voltage the switching point of said switching unit is greater than the amplitude of the voltage on the line to which said branch is connected, and to turn said current off whatever the amplitude of the voltage on the switching point.

9. A multi-level converter device according to claim 8, wherein the second switching group of each intermediate voltage branch and of each switching unit is designed to further enable conduction of a current in an opposite direction to the first direction when the amplitude of the voltage on the switching point of said switching unit is lower than the amplitude of the voltage on the line to which said branch is connected.

10. A multi-level converter device according to claim 8, wherein the second switching group of each intermediate voltage branch and of each switching unit comprises: a transistor for enabling conduction of a current in a first direction when amplitude of the voltage on the switching point is greater than the amplitude of the voltage on the line to which said branch is connected, at least one diode connected in series with said transistor and directed to let a current flowing in said first direction pass, and a diode connected in parallel to said transistor and reverse-directed with respect to said transistor.

11. A multi-level converter device according to claim 10, wherein the second switching group of each intermediate voltage branch and of each switching unit further comprises a transistor directed to enable conduction of a current in the opposite direction to the first direction when the amplitude of the voltage on the switching point is lower than the amplitude of the voltage on the line to which said branch is connected.

12. A multi-level converter device according to claim 7, wherein the first switching group of each maximum voltage branch and of each switching unit comprises at least one diode directed to at least turn the current off in a second direction when the amplitude of the voltage on the switching point of said switching unit is lower than the amplitude of the voltage on the line to which said branch is connected.

13. A multi-level converter device according to claim 12, wherein the first switching group of each maximum voltage branch and of each switching unit further comprises a transistor designed to enable conduction of a current in an opposite direction to the second direction when the amplitude of the voltage on the switching point is lower than the amplitude of the voltage on the line to which said branch is connected.

14. A multi-level converter device according to claim 7, wherein the third switching group of each minimum voltage branch and of each switching unit is designed to enable conduction of a current in at least a third direction when the amplitude of the voltage on the switching point of said switching unit is greater than the amplitude of the voltage on the reference voltage line, and to let a current flow in an opposite direction to said third direction.

15. A multi-level converter device according to claim 14, wherein the third switching group of each intermediate voltage branch and of each switching unit comprises: a transistor directed to enable conduction of a current in the third direction when the amplitude of the voltage on the switching point of said switching unit is greater than the amplitude of the voltage on the reference voltage line, and a diode connected in parallel to said transistor and directed to let a current flowing in an opposite direction to said third direction pass.

16. An uninterruptible power supply comprising a multi-level converter device according to claim 1, a power supply input to which an AC input voltage is applied, a rectifier connected to said input, two substantially DC voltage lines of opposite signs connected to an output of said rectifier, wherein said converter is an inverter connected to said substantially DC voltage lines and comprising an output for supplying a backed-up AC voltage from the substantially DC voltage lines.

* * * * *